United States Patent
Thömmes

(10) Patent No.: US 9,440,551 B2
(45) Date of Patent: Sep. 13, 2016

(54) PRECHARGING A MOTOR VEHICLE HIGH-VOLTAGE NETWORK

(71) Applicant: AUDI AG, Ingolstadt (DE)

(72) Inventor: Marco Thömmes, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/891,594

(22) PCT Filed: Mar. 27, 2014

(86) PCT No.: PCT/EP2014/000821
§ 371 (c)(1),
(2) Date: Nov. 16, 2015

(87) PCT Pub. No.: WO2014/183820
PCT Pub. Date: Nov. 20, 2014

(65) Prior Publication Data
US 2016/0089998 A1    Mar. 31, 2016

(30) Foreign Application Priority Data
May 17, 2013   (DE) .................. 10 2013 008 586

(51) Int. Cl.
*B60L 9/00*   (2006.01)
*B60L 11/00*  (2006.01)
(Continued)

(52) U.S. Cl.
CPC .......... *B60L 11/1851* (2013.01); *B60L 3/0046* (2013.01); *B60L 3/0069* (2013.01);
(Continued)

(58) Field of Classification Search
CPC .............................. B60L 11/1851; H02J 7/345
USPC ............................................ 701/22; 320/166
See application file for complete search history.

(56) References Cited

U.S. PATENT DOCUMENTS 7,586,214 B2   9/2009   Clarke et al.
8,970,169 B2   3/2015   Thömmes et al.
(Continued)

FOREIGN PATENT DOCUMENTS

DE       2007 048 620 A1   4/2008
DE   10 2008 012 418 A1   9/2009
(Continued)

OTHER PUBLICATIONS

International Search Report issued by the European Patent Office in International Application PCT/EP2014/000821.

*Primary Examiner* — Tuan C. To
*Assistant Examiner* — Isaac Smith
(74) *Attorney, Agent, or Firm* — Henry M. Feiereisen LLC

(57) ABSTRACT

In a method for controlling a connection of a high-voltage source of a motor vehicle to a high-voltage network of the motor vehicle, first at least one test value for an electrical operating variable of the high-voltage network is determined by means of a control device of the motor vehicle after a connection command is received. The electrical operating variable depends on a capacitance actually effective at a connection of the high-voltage source to the high-voltage network. Only when the at least one test value meets a predefined safety condition, is a precharge current of the high-voltage source conducted via a first precharge resistor, which limits the precharge current, to the connection and into the high-voltage network to charge up a capacitor of the high-voltage network. Otherwise the precharge current is blocked.

8 Claims, 6 Drawing Sheets

(51) Int. Cl.
  *G05F 1/00* (2006.01)
  *B60L 11/18* (2006.01)
  *B60L 3/00* (2006.01)
  *B60L 3/12* (2006.01)
  *H02H 11/00* (2006.01)

(52) U.S. Cl.
  CPC ............ *B60L 3/12* (2013.01); *B60L 11/1809* (2013.01); *B60L 11/1861* (2013.01); *H02H 11/005* (2013.01); *B60L 2270/20* (2013.01); *Y02T 10/705* (2013.01); *Y02T 10/7005* (2013.01); *Y02T 10/7044* (2013.01); *Y02T 10/7072* (2013.01); *Y02T 90/14* (2013.01)

(56) References Cited

U.S. PATENT DOCUMENTS

| | | | |
|---|---|---|---|
| 9,057,750 | B2 | 6/2015 | Thömmes |
| 2001/0028571 | A1 | 10/2001 | Hanada et al. |
| 2008/0092258 | A1* | 4/2008 | Clarke .................. B60L 1/003 307/10.1 |
| 2013/0035819 | A1 | 2/2013 | Wolft |

FOREIGN PATENT DOCUMENTS

| | | |
|---|---|---|
| DE | 10 2010 015 312 A1 | 10/2011 |
| DE | 10 2010 056 235 A1 | 6/2012 |

* cited by examiner

PRECHARGING A MOTOR VEHICLE HIGH-VOLTAGE NETWORK

CROSS-REFERENCES TO RELATED APPLICATIONS

This application is the U.S. National Stage of International Application No. PCT/EP20141000821, filed Mar. 27, 2014, which designated the United States and has been published as International Publication No. WO 2014/183820 and which claims the priority of German Patent Application, Serial No. 10 2013 008 586.1, filed May 17, 2013, pursuant to 35 U.S.C. 119(a)-(d).

BACKGROUND OF THE INVENTION

The invention relates to a motor vehicle with a high-voltage network and a high-voltage source, for example a traction battery. The invention also includes a method for controlling connecting the high-voltage source to the high-voltage network. The term high-voltage in the context of the present invention means an electric DC voltage of greater than 60 Volt, in particular greater than 200 Volt.

In motor vehicles, in particular electrically driven motor vehicles, it can be provided to supply electric consumers with high-voltage. For this purpose, the high-voltage consumers are coupled with a high-voltage source, for example a traction battery, a high-voltage generator with rectifier or a fuel-cell stack, via an intermediate circuit, for example busbars. The high-voltage consumers and the high-voltage intermediate circuit together form a high-voltage network, which is supplied with electric power by the high-voltage source. A high-voltage consumer can for example be an electric drive motor with inverter or an air conditioning system.

In such high-voltage vehicles, usually a pre-charging for charging the high-voltage intermediate circuit is performed in order to charge the intermediate-circuit capacitances that effectively receive power through the connection of the high-voltage source to the high-voltage network. Without this pre-charging the intermediate capacitance would suffer damage from the very high switch-on current. Likewise, the high-voltage switches of the high-voltage source would also suffer damage when being closed without pre-charging. After the start of the pre-charging, which is usually realized via a pre-charging relay and pre-charge resistor, the high-voltage generated by the high-voltage source is also reached in the high-voltage intermediate circuit after a predetermined time period. This pre-charging usually takes less than one second, i.e., for example a few 100 milliseconds. Usually, in the case of a voltage delta, i.e., in case of a voltage difference between the high-voltage of the high-voltage source and the voltage of the intermediate circuit, a second main switch, connected in parallel to the pre-charging relay and the pre-charge resistor, is already closed between the high-voltage source and the high-voltage network. The main switch can for example already be closed at a voltage delta of less than 10 Volts.

Because the pre-charging has to occur very quickly, a very small pre-charge resistor is used having a value that is uncritical for the components of the high voltage network. For a person, however, the pre-charge current that flows in this case is potentially hazardous. The reason for conducting the pre-charging as quickly as possible is that in the absence of errors the driver should not have to wait unnecessarily before the motor vehicle is operational. On the other hand, in the case of a defect in the high-voltage network, a person may come into contact with lines or devices of the high-voltage network. This is in particular the case in repair shops when the high-voltage network has to be checked, for example after an accident. In this case the relatively small pre-charge resistor offers no protection when the damaged high-voltage network is connected to the high-voltage source, for example to take the damaged motor vehicle on a test drive. A possible defect is for example that a non-mounted screw contact on a high-voltage component leaves a high-voltage line without insulation in the motor vehicle. A person touching these contacts during the pre-charging process may suffer a dangerous electric shock.

From DE 10 2008 012 418 A1 a high voltage system for a motor vehicle is known in which an intermediate circuit capacitor can be charged via a pre-charge resistor before a high-voltage battery is connected directly, i.e., without pre-charge resistor, to the high-voltage intermediate circuit. During the pre-charging the pre-charge current is monitored. When the pre-charge current is absent it is concluded that a contact of the high-voltage battery to the high-voltage network is missing and as a consequence the pre-charging is interrupted. A disadvantage of this system is that during this measurement a current may flow which, due to the small pre-charge resistor, is hazardous to a person.

From DE 10 2010 015 312 A1 a high-voltage system for a motor vehicle is known, which includes a diagnostic device with a measuring device for measuring a voltage course at an intermediate circuit capacitor. In particular during the discharging process of the intermediate circuit capacitor, the voltage course is measured and analyzed regarding whether a malfunction of the high-voltage system exists. Also in this system, electric currents occur in the high-voltage network during testing for malfunctions, which may be dangerous to a person's life.

SUMMARY OF THE INVENTION

The invention is based on the object to recognize a defect in the high-voltage network of a motor vehicle having such a high-voltage network and a high-voltage source, before a person is exposed to danger.

The object is solved with a method and a motor vehicle according to the respective independent claims. Advantageous refinements of the invention are set forth in the dependent claims.

The invention provides a pre-charging for a capacitance of the high-voltage network, wherein the pre-charging additionally includes recognition of an error of the onboard electric network, i.e., recognition of the presence of unconnected lines or separated lines. In the present context, the term pre-charging means the already described charging of the capacitance of the high-voltage network by means of a pre-charge current of the high-voltage source via a first pre-charge resistor which limits the pre-charge current.

In the method according to the invention, a control device of the motor vehicle first determines at least one test value for an electrical operating parameter of the high-voltage network prior to initiating the actual pre-charging phase (with the pre-charge current that is harmful for humans). The method starts with receiving the connection command, which calls for connecting the high-voltage source to the high-voltage network. Then it is tested which capacitance is actually active on the connection via which the high voltage source is connected with the high voltage network. The tested operating parameter can for example be an electric voltage that acts on the two contacts (plus and minus) of the connection. When a cable is severed in the high-voltage network or when a cable was separated from a high-voltage component, no electric connection is present between the capacitance of this high-voltage component and the connector of the high-voltage source. Thus the capacitance that is actually active on the connection of the high-voltage source is smaller than it should be if the high-voltage network was intact. This can then be recognized by way of the test value of the operating parameter. In this case, an operating parameter is thus generally selected that depends on a capacitance that is actually effective on the contact.

Only when the at least one test value satisfies a predetermined safety condition, the pre-charge current of the high-voltage source is then conducted via the first pre-charge resistor to the connection and into the high-voltage network. Otherwise the pre-charge current is blocked. In other words the actual pre-charging phase is not initiated in the first place when a defect of the high-voltage network is recognized by way of the at least one test value.

The method according to the invention has the advantage that the test value is determined under electrical conditions that are not life-threatening to a person even when the person for example comes into contact with an electric line of the high-voltage network. The at least one test value can hereby also be determined very quickly so that in the absence of an error no delay occurs for a driver for starting the drive.

The motor vehicle according to the invention correspondingly has a high-voltage network and a high-voltage source connected via a connection to the high-voltage network, in particular the battery cells of a high-voltage battery. In a manner known per se a pre-charging switch is provided in the motor vehicle according to the invention, which has a first controllable switch element, which is configured, when in the electrically conducting state, to connect the high-voltage source with the connection of the high-voltage source to the high voltage network via a first pre-charge resistor. The described faster but dangerous pre-charging is possible via the first pre-charge resistor. A control device is configured to generate a first control signal for the first switching element in dependence on a connection command so that the pre-charge current flows from the high-voltage source via the first pre-charge resistor to the connection into the high-voltage network. In the motor vehicle according to the invention the control device is additionally configured to implement an embodiment of the method according to the invention and hereby to generate the first control signal only when the at least one test value satisfies the predetermined safety condition.

Correspondingly the same advantages are obtained with the motor vehicle according to the invention as with the method according to the invention.

With regard to the mentioned safety condition it is important what operating parameters are measured, i.e., on what operating parameter the test value is based. A suitable safety condition is that the at least one test value respectively has to lie within a set value interval. The set value interval is hereby formed by at least one set value as it results when the actually active capacitance corresponds to a normally expected capacitance of the high voltage network, i.e., when the high-voltage consumers are actually electrically connected to the connection via their respective intermediate circuit capacitances. When a cable has become detached or another onboard network error has occurred, the actually effective capacitance is reduced compared to the normally expected capacitance of the high-voltage network because one or more intermediate circuit capacitances are no longer connected to the connection of the high-voltage source.

What operating parameters are used for determining the test value depends on the design of the motor vehicle in which the invention is to be implemented. For example an AC voltage can be generated at the connection, in particular a high-frequency AC voltage of over 1000 Hertz, so that based on the then flowing AC current conclusions can be drawn regarding the actually effective capacitance connected to the connection of the high voltage source.

In a preferred embodiment of the invention, however, a test current is conducted from the high-voltage source itself via a second pre-charge resistor to the connection to determine the at least one test current. This second pre-charge resistor has a greater resistance value than the first pre-charge resistor. This embodiment has the advantage that, independent of the resistance value of the first pre-charge resistor via which the actual pre-charging is to be performed as fast as possible, a second pre-charge resistor is now used whose resistance can be selected so as to prevent a risk to a person even when the person touches a line of the high-voltage network while the test current is flowing. In this embodiment of the method preferably at least one voltage value or a current strength value is determined as the at least one test value.

An embodiment of the motor vehicle according to the invention corresponds to this embodiment of the method.

The test current preferably causes a first low pre-charging of the capacitance actually effective on the connection, and this first pre-charging is monitored based on the at least one test value. The term first pre-charging in this context means in particular a pre-charging of the actually effective capacitance to a voltage value which is only a fraction, in particular less than 30 percent, preferably less than 20 percent of the normally expected intermediate circuit high-voltage, i.e., the high-voltage generated by the high-voltage source. This first pre-charging can be concluded within a relatively short time, in particular less than 300 milliseconds, so that the determining of the at least one test value does not noticeably delay the starting process.

The second pre-charge resistor preferably limits the test current to current strength values, which at a given electrical high-voltage of the high-voltage source is smaller than a body current harmful to a human. How high this value for the body current can be thus depends on the high-voltage and can be found in the relevant literature relating to the safety of electrical devices. For this, corresponding standards exist regarding permissive durations for currents on the body or the corresponding magnitude of the current on the body (IEC60479). Preferably this standard is used as a guideline for configuring the resistance values. When it is ensured, via the resistance ratio of great second pre-charge resistor and the human resistance, that 60 Volt or 120 Volt are not exceeded when a human for example touches a cable of the high voltage network, then the temporal aspect does not play a role. A possible basis for calculating the greater pre-charge resistor, i.e., the second pre-charge resistor, results from the fact that the voltage drop via the human (whose body has a resistance of about 1000 ohm) must not exceed a voltage dangerous to the touch. In the automobile industry this is usually 60 volts, in electrical engineering 120 volts. Preferably the current strength value herby is less than 15 milliampere, particularly preferably less than 10 milliampere.

After completion of the first pre-charging, the actual pre-charging can then be performed via the first pre-charge resistor having the lower resistance value, when the at least one test value satisfies the safety condition, so that the capacitance of the high-voltage source is charged. By closing a further main switch the high-voltage source can then be connected directly, i.e., without a pre charging, to the high voltage network, so that an operating current can be conducted to the high-voltage consumers without losses in the pre-charge resistors.

As explained above, the second pre-charge resistor is an additional circuit component, which ensures a sufficiently high resistance for protection against an electric shock when testing the high-voltage network, without a driver having to accept a noticeably longer pre-charging time. Thus beside the actual first pre-charge resistor with a relatively small resistance value an additional second pre-charge resistor with a greater resistance value is additionally connected in the pre-charge circuit, so that via the latter a harmless test current flows which allows determining whether the high-voltage network is connected in the first place and is without error. In the context of the invention the term pre-charge resistor means a single discrete component or an arrangement of multiple electrical components, which together exhibit the pre-charge resistor with the predetermined resistance value with regard to connection clamps of this component network.

The first switching element with which the actual pre-charging phase (high pre-charge resistor) is initiated, is hereby configured in the electrical conducting state to conduct a current flowing form the high-voltage source to the connection of the high voltage source predominantly or entirely past the second pre-charge resistor.

In this regard two preferred embodiments exist. In an embodiment of the motor vehicle according to the invention, the first switching element and the first pre-charge resistor together form a first branch circuit and the second switching element and the second pre-charge resistor together form a second branch circuit, wherein the first and second branch circuit couple the high-voltage source with the connection independent of each other. For example the two branch circuits can thus be connected in parallel to each other. This has the advantage that in case of a defect of the test branch, i.e., the branch circuit with the second switching element and the high-ohm second pre-charge resistor, a (untested) pre-charging of the high-voltage network is still possible, i.e., the motor vehicle remains operational.

In an alternative embodiment, the first pre-charge resistor and the second pre-charge resistor are together coupled with the high voltage source or the connection via the first switching element. This has the advantage that only the first switching element has to be configured as galvanically decoupling switching element. The second switching element for ending the testing phase and initiating the actual pre-charging phase can then for example also be a semiconductor switching element, such as an IGBT (insulated gate bipolar transistor) be.

In the motor vehicle according to the invention the high voltage source is preferably connected to the high-voltage network as follows: In response to receiving the connection demand, for example via a CAN-Bus (CAN—Controller Area Network), the control device first switches the second switching element of the pre-charging switch into an electrically conducting state by generating a second control signal, without hereby generating the first control signal (for initiating the actual pre-charging with hazardous pre-charge current). As a result the test current is then conducted from the high-voltage source via the second pre-charge resistor to the connection. When then the at least one test value, for example after a predetermined test time, satisfies the safety conditions, the first control signal can be generated which then results in switching of the first switching element, and the actual pre-charge current is conducted into the high-voltage network. A safety condition can for example be that after the predetermined time period, for example 200 milliseconds or 300 milliseconds or 400 milliseconds, an electrical voltage has to be built up in the high-voltage network, which is smaller than a predetermined threshold value, for example 60 Volts or 120 Volts. When this is not the case it can be concluded that the capacitance actually effective on the connection is significantly smaller than the normally expected capacitance of the high voltage network.

BRIEF DESCRIPTION OF THE DRAWING

In the following, the invention is again explained by way of a concrete exemplary embodiment. For this it is shown in.

The examples represent preferred embodiments of the invention.

DETAILED DESCRIPTION OF PREFERRED EMBODIMENTS

In the exemplary embodiments explained below, the described components of the embodiments and the described steps of the methods are in each case individual features of the invention that have to be regarded independent of each other, and which respectively each constitute refinements of the invention independent of each other and with this are to be regarded as a component of the invention, either individually or in a different one than the shown variation. The described embodiments may also be modified by including further described features of the invention.

Figure 1:
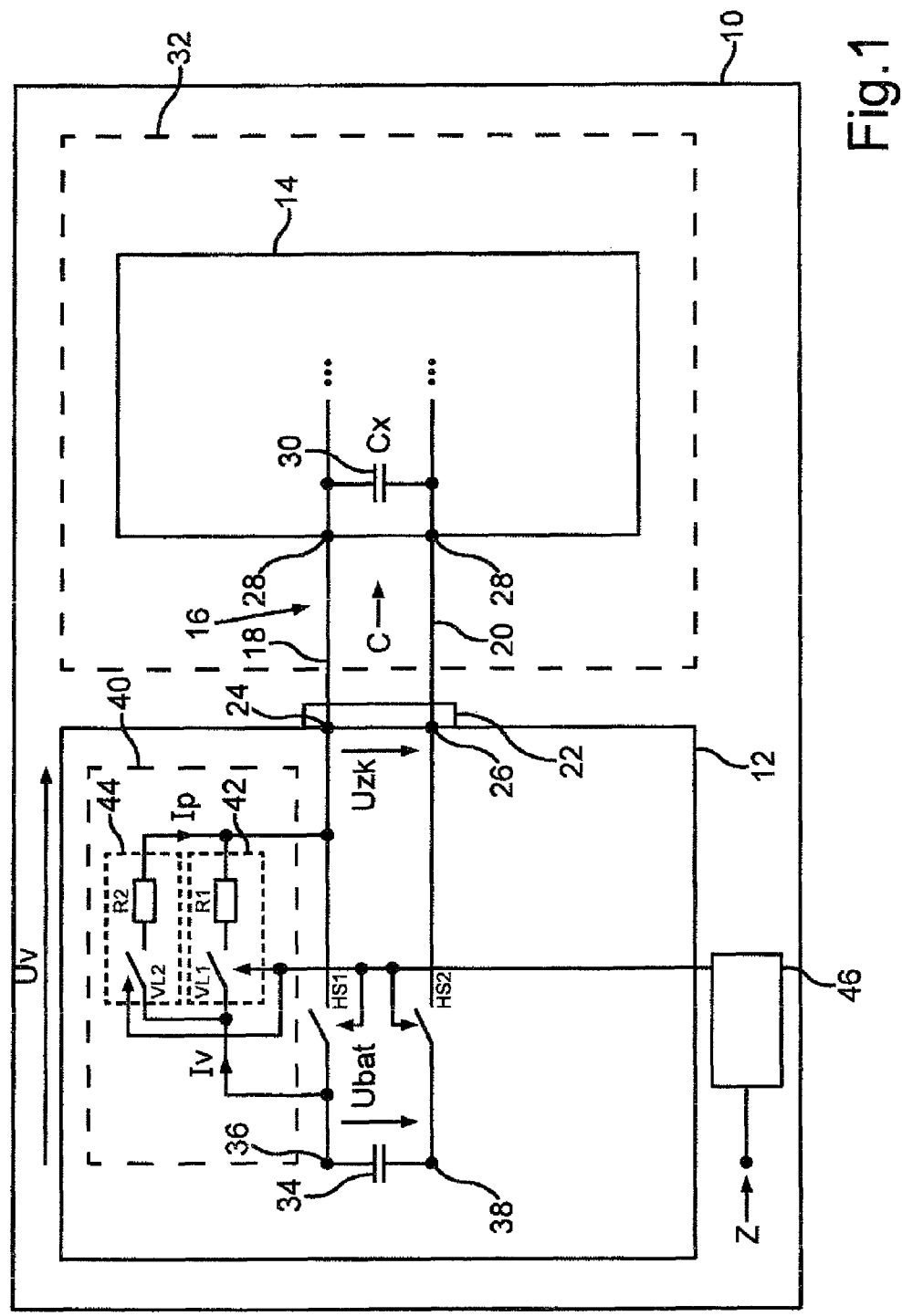
FIG. 1 a schematic representation of an embodiment of the motor vehicle according to the invention, FIG. 2 a diagram with time courses of electrical operating parameters, as they result in a pre-charging according to the state of the art.

FIG. 1 shows a motor vehicle 10, for example an automobile, in particular a passenger car. The motor vehicle 10 has a high-voltage supply 12, for example a high-voltage battery. The motor vehicle 10 also has one or more high-voltage components, wherein FIG. 1 only shows a single high-voltage component 14. The high-voltage component can for example be an electric drive motor of the motor vehicle 10. The voltage supply 12 and the high-voltage component 14, and also the remaining high-voltage components, can be electrically coupled with each other in the motor vehicle 10 via a high-voltage intermediate circuit or short, intermediate circuit 16. The intermediate circuit 16 can for example include a plus line 18 and a minus line 20, wherein the lines 18, 20 can each include a cable or a busbar. The intermediate circuit 16 can be connected to the voltage supply 12 at a connection 22 of the voltage supply 12. For this, the connection 22 can have a plus contact 24 and a minus contact 26. The component 14 can be connected to the intermediate circuit 16 via electrical contacts 28. The electrical contacts 28 can for example include screws. The component 14 can have a capacitor 30, which can be a smoothing capacitor or a storage capacitor. The capacitor 30 can have a capacitance Cx. Also the remaining (not shown) high-voltage components can include capacitors with corresponding capacitances.

The intermediate circuit 16 and the high-voltage components (including the component 14) together form a high-voltage network 32 of the motor vehicle 10. With regard to the connection 22, the high-voltage network 32 has a total capacitance C, which can be formed by the individual capacitances of the components, such as the capacitance Cx, and an intermediate circuit capacitor (not shown in FIG. 1) of the intermediate circuit 16. The capacitance C can for example be between 0.1 millifarad and 10 millifarad.

The voltage supply 12 can have a battery-cell series connection or a battery-cell stack 34, by which a high-voltage Ubat can be generated. The stack 34 represents a high-voltage source. The high-voltage Ubat can for example be 600 Volts. In order to connect the stack 34 with the intermediate circuit 16, the voltage supply 12 can have two main switches HS1, HS2.

The main switches HS1, HS2 can for example be contactors or relays. Each main switch HS1, HS2 connects one connection 36, 38 of the stack 34 with one of the contacts 24, 26 of the connection 22 directly, i.e., without a further resistance element. However, in order to be able to connect the stack 34 with the intermediate circuit 26, a pre-charging is required in which the capacitance C of the high-voltage network 32 is charged at a limited pre-charge current Iv, the voltage supply 12 can have a pre charging circuit 40. The pre-charge circuit 40 can be connected in parallel to one of the main switches HS1, HS2 between one of the connections 36, 38 of the stack 34 and the associated contact 24, 26 of the connection 22. The pre-charge circuit 40 can have a pre-charge resistor R1 and a second pre-charge resistor R2. The pre-charge circuit 40 can further have a first switching element VL1 and a second switching element VL2. In the example shown in FIG. 1 the pre-charge resistor R1 and the switching element VL1 together form a first branch circuit 42, and the pre-charge resistor R2 and the switching element VL2 together form a second branch circuit 44. The second pre-charge resistor R2 has a greater resistance value than the pre-charge resistor R1. The branch circuits 42, 44 in the pre-charge circuit 40 are connected in parallel to each other and thus connect the connection 36 with the contact 24 independent of each other. Both main switches HS1, HS2 and the switching elements VL1, VL2 are controllable. They are controlled in the motor vehicle 10 for example by a control device 46, which is a component of the voltage supply 12, or as shown in FIG. 1 can be provided external of the voltage supply 12. The control device 46 can for example include a microcontroller or a control unit.

The voltage supply 12 can have a (not shown) measuring device for measuring electrical voltages. For example the battery voltage Ubat generated by the stack 34 can be measured. Furthermore, the intermediate circuit voltage Uzk present between the contacts 24 and 26 on the connection 22 can also be measured. The difference (Ubat−Uzk) then, at closed main switch HS2, results in the electric voltage, which drops over the pre-charge circuit 40.

For starting the motor vehicle 10 the voltage supply 12 is connected to the high-voltage network 32. The start signal is received by the control device 36 as a connection command Z. Thereafter, the control device 36 closes the main switch HS2 so that a first connection 38 of the stack 34 is electrically connected with the contact 26 of the connection 22.

Then the switching element VL2 is closed in response to a control command of the control device 46, so that a test current Ip flows from the connection 36 of the stack 34 via the second pre-charge resistor R2 to the contact 24 of the connection 22 and into the high-voltage network 32. The test current Ip has a current strength, which is harmless for humans. The control device 46 hereby for example measures the measurable intermediate circuit voltage Uzk present at the connection 22. The individual measuring values represent test values. As an alternative, also the voltage that drops over to the pre-charge circuit 40 can be measured. By way of the test value or the test values the control device 46 determines whether an electrical error has occurred in the high-voltage network 32. When recognizing that no error is present, the control device 46 generates a signal for closing the first switching element VL1, which results in conduction of a further current now through the pre-charge resistor R1. Overall thus a pre-charge current Iv flows through the pre-charge circuit 40. The pre-charge current Iv at closed switching element VL1 can have a current strength that is life-threatening for humans. By measuring the intermediate circuit voltage Uzk, the control device 46 can test when the capacitance C of the high-voltage network 32 is completely charged or charged up to a defined tolerance value. Afterwards the main switch HS1 can be closed and the motor vehicle 10 can be operated. Overall this pre-charging may last less than one second.

The second switching element VL2 and the second pre-charge resistor R2 through which the test current Ip is conduced represent the solution according to the invention of the object described above. In order to illustrate the functioning of the second pre-charge resistor R2, the following compares the solution according to the invention to the solution known from the state of the art and also describes an error case.

Figure 2:
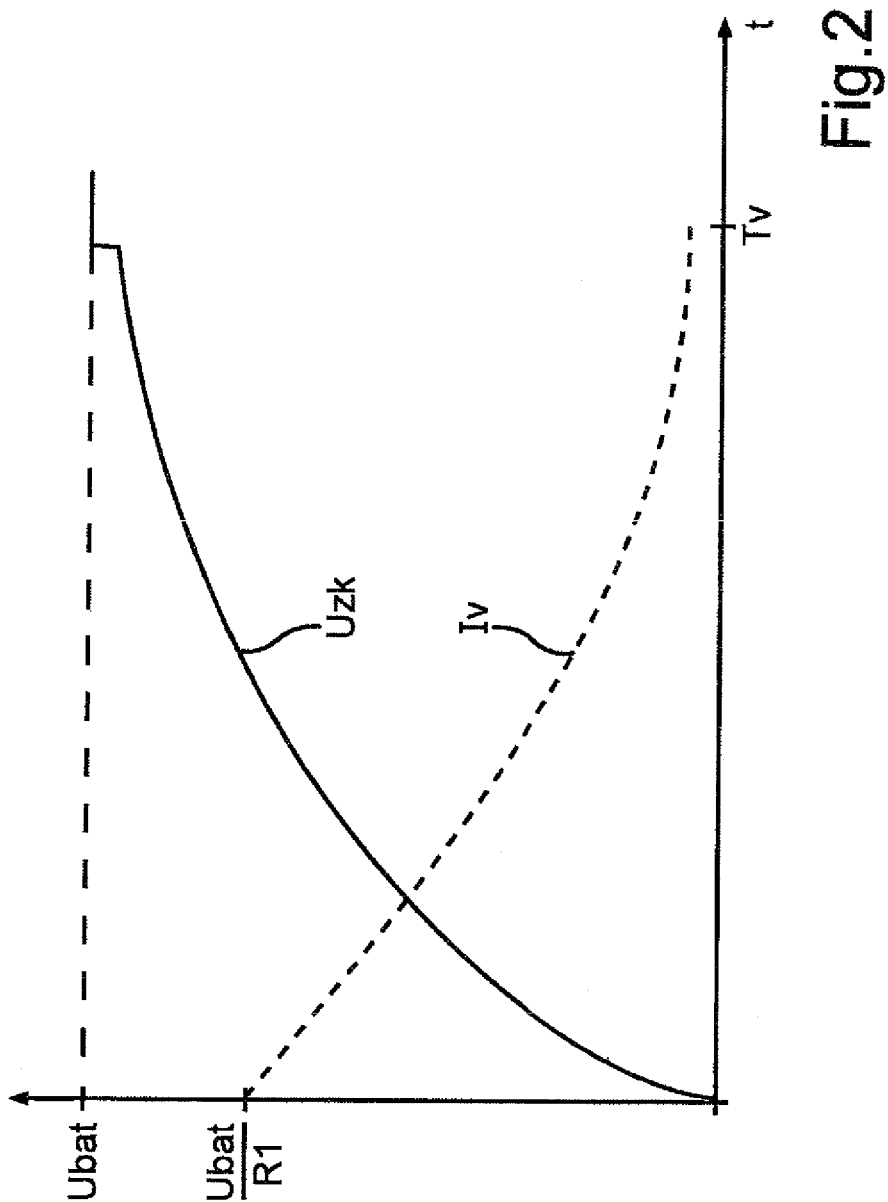

For this, FIG. 2 shows a diagram with time courses of the intermediate circuit voltage Uzk and the pre-charge current Iv plotted over the time t, as they result according to the state of the art when no second pre-charge resistor R2 with associated switching element VL2 is present. Subsequently, a corresponding control device immediately closes the switching element VL1 after receiving a connection signal Z, causing the pre-charge current Iv to flow over the pre-charge resistor R1 with low resistance. The pre-charge current Iv immediately has the maximal current strength Ubat/R1, which is only limited by the value of the pre-charge resistor R1 and the internal resistance of the cells 34. The pre-charging then lasts for a pre-charging time Tv, which can be less than one second.

Figure 3:
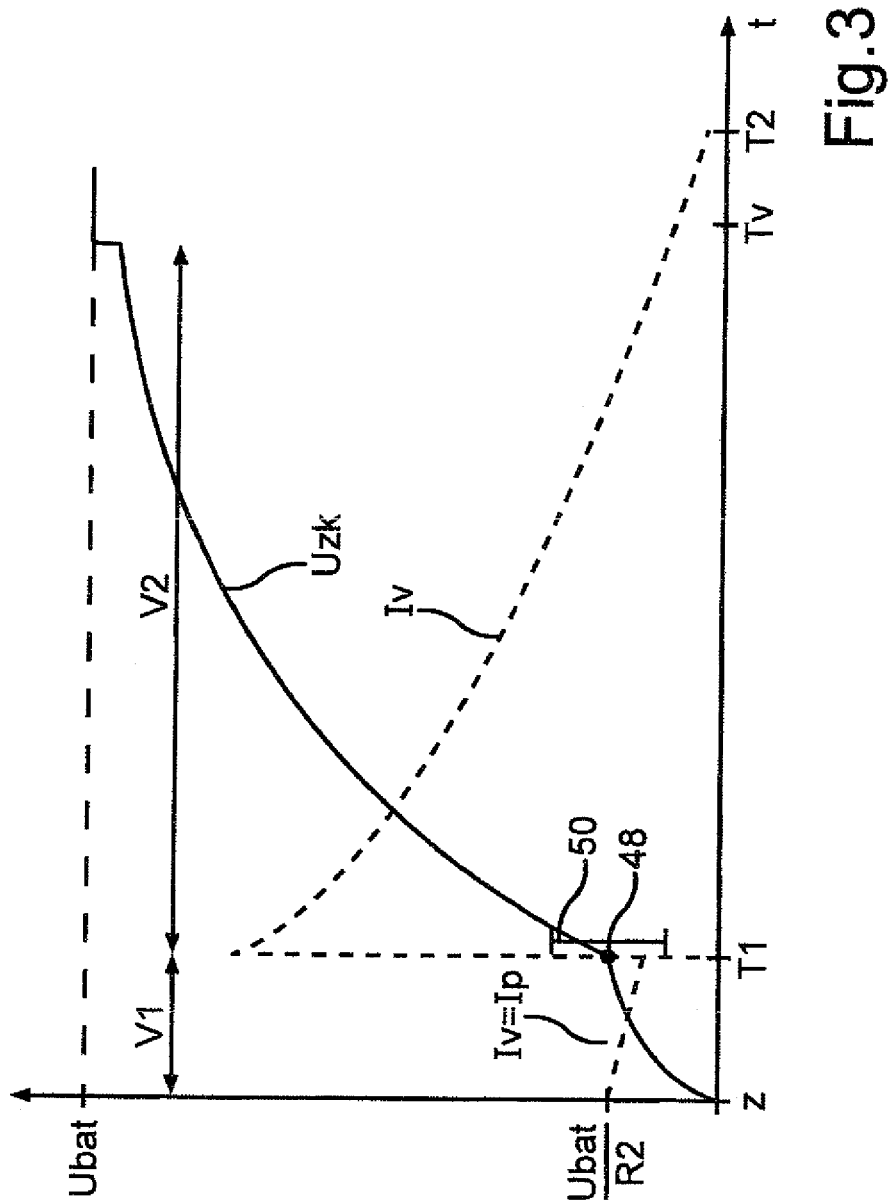
FIG. 3 a diagram with time courses of electrical operating parameters as they result in an embodiment of the method according to the invention in the absence of an onboard network error, FIG. 4 a diagram with temporal course of temporal courses of electrical operating parameters as they result in an embodiment of the method according to the invention when an onboard network error is present.

FIG. 3 illustrates the courses of the intermediate circuit voltage Uzk and the pre-charge current Iv, as they result when the high-voltage network 32 functions without errors, when the switches are controlled in the described manner by the control device 36. After receiving the connection signal Z and closing the main switch HS2, a first pre-charging phase is initiated by closing the switching element VL2, in which only the test current Ip flows into the high-voltage network 32. Hereby the capacitance of the high-voltage network 32 is charged with the test current Ip. The test current Ip is essentially limited by the second pre-charge resistor R2, i.e., a maximal current of Ubat/R2 results. It can then be provided to test, after a predetermined test time T1, how high the intermediate circuit voltage Uzk is in the connection 32. The test time T1 can for example be in the range from 50 milliseconds to 300 milliseconds, in particular between 50 milliseconds and 150 milliseconds.

The thus determined measuring value forms a test value 48. For example it can be tested whether the test value 48 is within a safety interval 50. The safety interval includes such voltage values of the intermediate circuit voltage Uzk that may result when the high-voltage network is error-free. In this regard multiple permissible values may result depending on how many components are currently connected to the intermediate circuit 16. Only when the test value 48 is within the safety interval 50 the actual pre charging phase V2 is initiated after the test time T1, in that the control device 48 closes the switching element VL1 and as a consequence a much higher pre-charge current Iv is enabled by conducting current also through the smaller resistance. Hereby it can be provided that the switching element VL2 either remains closed or is caused to assume the non-conducting state again. Overall, after a pre-charging time T2 the pre-charging of the capacitance C can be terminated and the first main switch HS1 can be then closed. FIG. 3 illustrates that the pre-charging time T2 is only insignificantly greater than the pre-charging time Tv known from the state of the art. However, in this case the pre-charging phase V1 includes the additional error recognition before a pre-charge current of critical magnitude flows in the pre-charging phase V2 for the actual pre-charging of the capacitance C.

Figure 4:
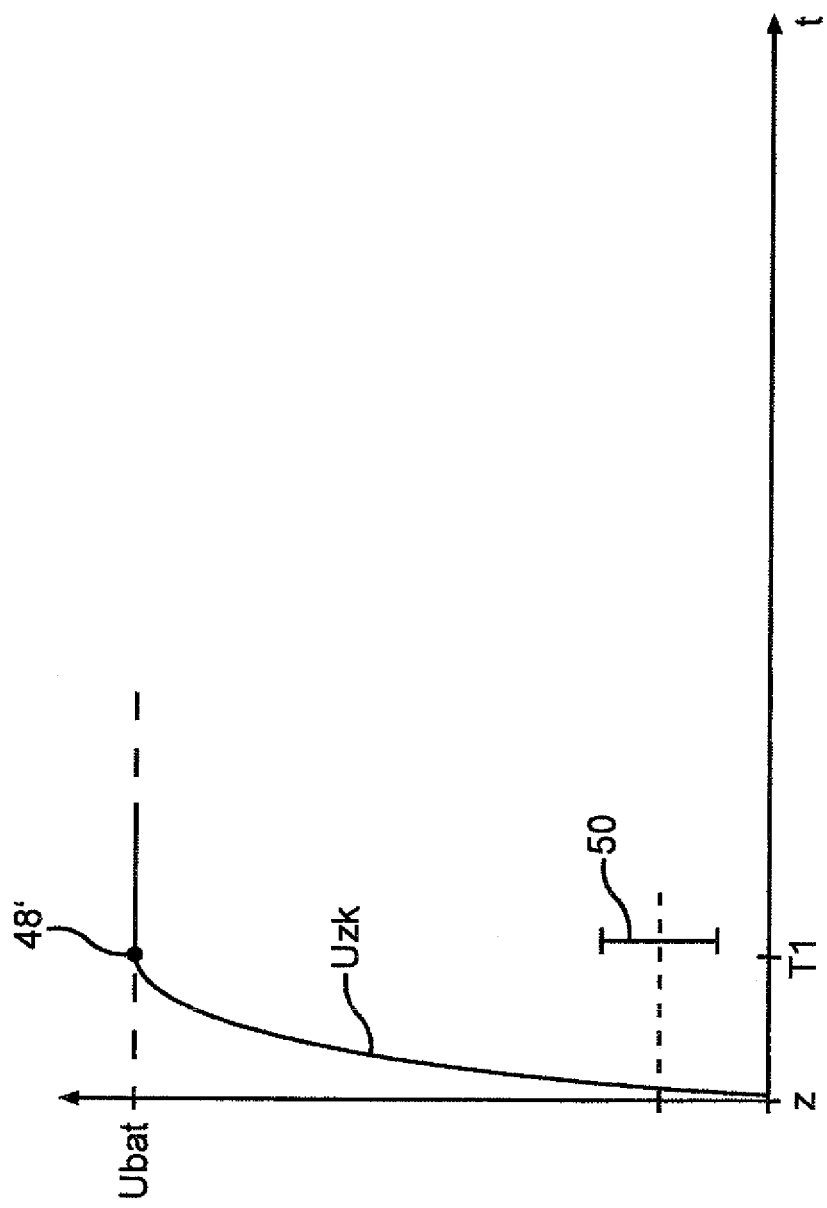

FIG. 4 shows the course resulting for the intermediate circuit voltage Uzk in case of an error in the high voltage network 32. For example one of the screws 28 of the component 14 may have become loose. After the test time T1 a test value 48' results, which is outside the safety interval 50. In this case the control device 46 no longer closes the main switch HS1. Instead it can be provided that the control device 46 decouples the stack 34 again entirely from the intermediate circuit 16 for example by opening all switches HS1 HS2, VL1, VL2.

Figure 5:
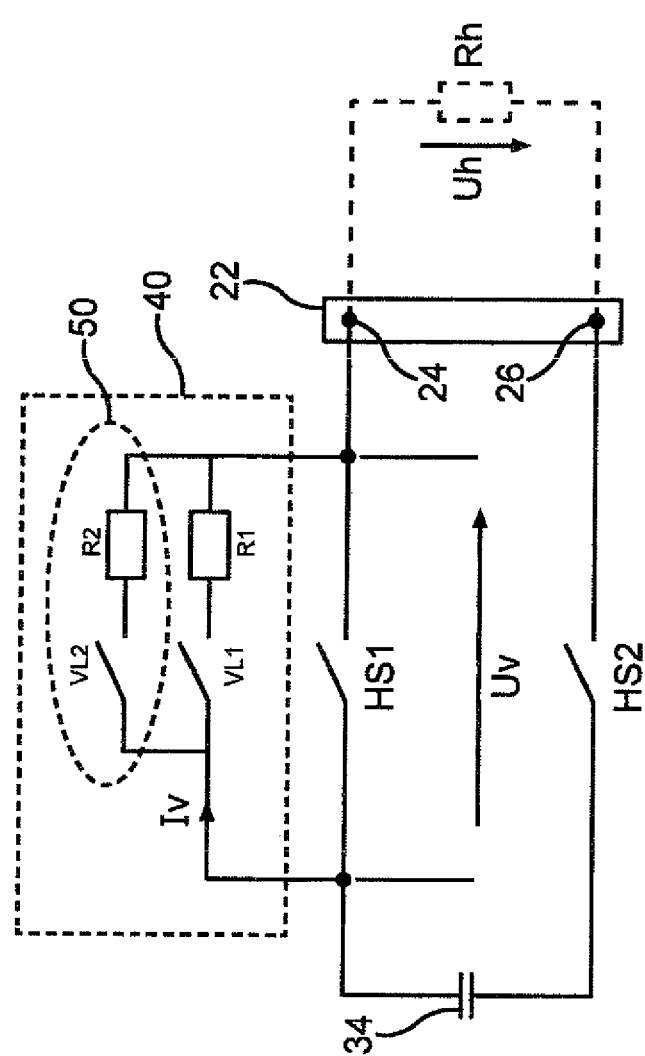
FIG. 5 a pre-charge circuit according to an embodiment of the motor vehicle according to the invention and FIG. 6 an alternative pre-charge circuit according to another embodiment of the motor vehicle according to the invention.

FIG. 5 again illustrates the case of the error on which FIG. 4 is based. FIG. 5 shows how a resistance Rh may result between the contacts 24, 26 of the connection 22, when a person (human) touches electrical lines of the high-voltage network 32.

The shown error case can be used for dimensioning the second pre charging resistance R2. R2 has to be of a magnitude that a voltage falls off via R2, which is so great that the residual voltage Uh, which drops at the human body is harmless. For example it can be provided that Uh=60 Volts. When the voltage Ubat of the cell stack 34 is for example 600 Volts (battery voltage) the relationship: 600 Volts×RH/(RH+R2)=60 Volt has to be satisfied. As resistance of the human body for example RH=1000 ohms can be assumed. With R2=10,000 ohm=10K ohm then a sufficient protection for a human results. Generally it is provided in the invention that R2 is in the range from 1,000 Ohm to 100,000 Ohm, in particular 5,000 Ohm to 20,000 Ohm. On the other hand the pre charging resistance R1 can be in a range from 0.5 Ohm to 1,000 Ohm, in particular 2 Ohm to 100 Ohm.

FIG. 5 again shows the additional switching component 50 provided in the pre-charge circuit 40 according to the invention.

Figure 6:
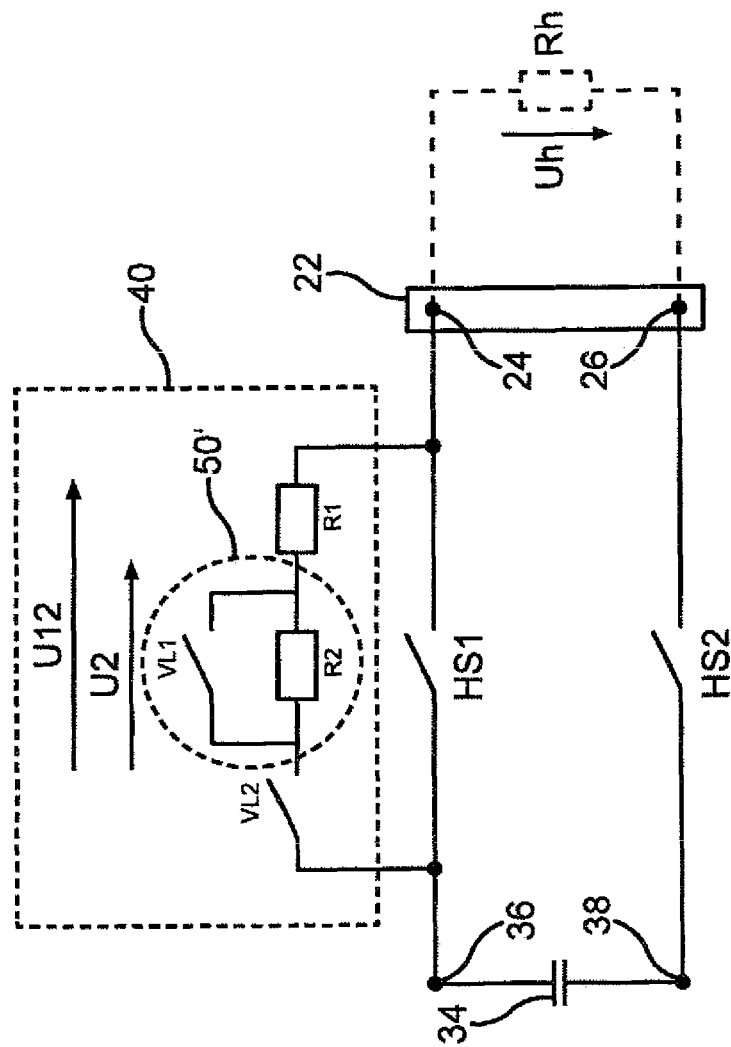

FIG. 6 shows an alternative embodiment for the motor vehicle according to the invention, in which the pre-charge circuit 40 includes a series connection of the pre-charge resistor R1 and the second pre-charge resistor R2. For reasons of clarity functionally equivalent elements are provided with the same reference numerals. With regard to the human, which causes the described error in the high voltage network 32, the circuit shown in FIG. 6 is analogous to the circuit shown in FIG. 5. For testing the high-voltage network 32, in the circuit according to FIG. 6, a control device first only closes the second switching element VL2 after the main switch HS2 has coupled the first connection 38 with the contact 26 of the connection 22. The overall resistance through which the test current is then limited, results as the series connection R1+R2. For terminating the first pre-charging phase V1 the first switching element VL1 the still has to be switched to the conducting state. The advantage of the circuit shown in FIG. 6 is that the switching element VL1 does not have to ensure a galvanic separation between the cell stack 34 and the connection 22. It is sufficient when the second switching element VL2 is a galvanically separating switching element i.e., for example a contactor or a relay. The switching element VL 1 on the other hand can be a semiconductor element.

For increasing the safety of high-voltage vehicles for persons, in particular for workshop staff and production staff, the invention thus proposes the following as illustrated by the examples:

The following sequence is ensured when connecting the voltage supply 12 to the high voltage network 32:
1. Closing the parallel pre-charging branch with high resistance, so that only a harmless body current can flow.
2. When the diagnosis is completed, the onboard network is connected, the actual pre charging branch is connected with a small resistance in order to quickly charge the intermediate circuit and to activate the high voltage system.

The diagnosis is hereby performed as follows: in the case of a not present intermediate circuit capacitor (capacitance C) the high voltage is immediately built up in the on board network. This voltage is however harmless because the high pre charging resistance limits the potential body current to non-critical values (usually smaller than 10 milliampere). Because the diagnosis can be performed quickly (a few milliseconds) the invention achieves the activation of the high voltage system and with the operability of the motor vehicle essentially with only a very small delay. With minimal delay of the pre-charging time the invention thus achieves a significantly higher safety level.

What is claimed is:

1. A method for controlling a connection of a high voltage source of a motor vehicle to a high-voltage network of the motor vehicle, comprising:
   receiving with a control device of the motor vehicle a connection command;
   determining with the control device at least one test value for an electrical operating parameter of the high-voltage network by conducting a test current from the high-voltage source via a first pre-charge resistor to the connection, said first pre-charge resistor having a first resistance value, said at least one test value comprising a voltage value or a current strength value, said electrical operating parameter depending on a capacitance of the high-voltage network actually effective on a connection of the high-voltage source to the high-voltage network, said test current causing a first pre-charging of the actually effective capacitance, said first pre-charging being monitored by the at least first test value;
   when the at least one test value satisfies a predetermined safety condition, conducting a pre-charge current of the high-voltage source via a second pre-charge resistor, which limits the pre-charge current, to the connection and into the high-voltage network to charge the capacitance of the high-voltage network, said second precharge resistor having a second resistance value which is lower than the first resistance value; and blocking the pre-charging when the at least one test value does not satisfy the predetermined safety condition.

2. The method of claim 1, wherein the predetermined safety condition is satisfied when the at least one test value is within a target value interval, said target value interval being formed by at least one target value as it results when the actually effective capacitance corresponds to a target capacitance of the high-voltage network.

3. The method of claim 1, wherein the second pre-charge resistor limits the test current to a current strength value, which is smaller than a harmful body current for a human at a given electric high-voltage of the high-voltage source.

4. A motor vehicle, comprising
a high-voltage network;
a high-voltage source connected to the high-voltage network via a connection;
a pre-charge circuit comprising a first pre-charge resistor, a second pre-charge resistor, a first controllable switching element and a second controllable switching element, said second pre-charge resistor having a resistance value greater than a resistance value of the first pre-charge resistor, said first controllable switching element in an electrically conducting state thereof connecting the high-voltage source with the connection via the first pre-charge resistor, said second switching element in an electrically conducting state thereof conducting a test current from the high-voltage source via the second pre-charge resistor to the connection; and
a control device configured to receive a connection demand and in response to receiving the connection command
to close the second switching element and to determine at least one test value for an electrical operating parameter of the high-voltage network as a function of the test current, said at least one test value comprising a voltage value or a current strength value, said electrical operating parameter depending on a capacitance of the high-voltage network actually effective on a connection of the high-voltage source to the high-voltage network, said test current causing a first pre-charging of the actually effective capacitance, said first pre-charging being monitored by the at least first test value, and
to generate a first control signal for switching the first switching element into the connected state,
only when the at least one test value satisfies a predetermined safety condition.

5. The motor vehicle of claim 4, wherein the first switching element is configured in the electrically conducting state to conduct a current flowing from the high-voltage source to the connection predominantly or entirely past the second pre-charge resistor.

6. The motor vehicle of claim 4, wherein the first switching element and the first pre-charge resistor form a first branch circuit and the second pre-charge resistor and the second switching element form a second branch circuit, said first and second branch circuits coupling the high-voltage source with the connection independent of each other.

7. The motor vehicle of claim 4, wherein the first pre-charge resistor and the second pre-charge resistor are together coupled with the high-voltage source or the connection via the second switching element.

8. The motor vehicle of claim 4, wherein the control device is configured to switch the second switching element of the pre-charge circuit into the electrically conducting state in response to the connection command by first generating a second control signal, without thereby conducting a test current from the high-voltage source to the connection via the second pre-charge resistor.

* * * * *